US009280316B2

(12) United States Patent
Boersma et al.

(10) Patent No.: US 9,280,316 B2
(45) Date of Patent: *Mar. 8, 2016

(54) FAST NORMALIZATION IN A MIXED PRECISION FLOATING-POINT UNIT

(71) Applicant: International Business Machines Corporation, Armonk, NY (US)

(72) Inventors: Maarten J. Boersma, Holzgerlingen (DE); Thomas Fuchs, Bietigheim-Bissingen (DE); Markus Kaltenbach, Holzgerlingen (DE); David Lang, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/151,006

(22) Filed: Jan. 9, 2014

(65) Prior Publication Data
US 2015/0149522 A1 May 28, 2015

Related U.S. Application Data

(63) Continuation of application No. 14/089,882, filed on Nov. 26, 2013.

(51) Int. Cl.
*G06F 7/48* (2006.01)
*G06F 5/01* (2006.01)
*G06F 7/499* (2006.01)
*G06F 7/483* (2006.01)

(52) U.S. Cl.
CPC ........ *G06F 7/483* (2013.01); *G06F 5/01* (2013.01); *G06F 7/49936* (2013.01); *G06F 2207/3808* (2013.01)

(58) Field of Classification Search
None
See application file for complete search history.

(56) References Cited

U.S. PATENT DOCUMENTS

| | | | | |
|---|---|---|---|---|
| 5,646,875 A | * | 7/1997 | Taborn et al. | 708/508 |
| 5,903,479 A | * | 5/1999 | Schwarz et al. | 708/205 |
| 6,154,760 A | * | 11/2000 | Sharangpani | 708/205 |
| 6,185,593 B1 | * | 2/2001 | Brooks | G06F 5/012 708/205 |
| 6,701,427 B1 | * | 3/2004 | Hinds et al. | 712/244 |
| 7,730,117 B2 | | 6/2010 | Fleischer et al. | |
| 8,346,828 B2 | | 1/2013 | Boersma et al. | |
| 8,386,756 B2 | | 2/2013 | Schwarz et al. | |
| 2006/0179097 A1 | * | 8/2006 | Fleischer | G06F 7/483 708/495 |
| 2007/0061391 A1 | * | 3/2007 | Tan | G06F 7/49936 708/495 |
| 2010/0095099 A1 | * | 4/2010 | Boersma et al. | 712/222 |

OTHER PUBLICATIONS

E. Schwarz et al., "FPU Implementations with Denormalized Numbers", IEEE Trans. Computers, vol. 54, No. 7, pp. 825-836, Jul. 2005.*

M. Boersma et al., "The POWER7 binary floating-point unit", 2011 20th IEEE Symposium on Computer Arithmetic, 2011.*

(Continued)

*Primary Examiner* — Andrew Caldwell
*Assistant Examiner* — Matthew Sandifer
(74) *Attorney, Agent, or Firm* — Maeve McCarthy

(57) ABSTRACT

A hardware circuit for returning single precision denormal results to double precision. A hardware circuit component configured to count leading zeros of an unrounded single precision denormal result. A hardware circuit component configured to pre-compute a first exponent and a second exponent for the unrounded single precision denormal result. A hardware circuit component configured to perform a second normalization of the rounded single precision denormal result back to architected format.

9 Claims, 4 Drawing Sheets

(56) References Cited

OTHER PUBLICATIONS

Boersma, et al., "The POWER7 Binary Floating-Point Unit", 2011 20th IEEE Symposium on Computer Arithmetic, © 2011 IEEE, DOI 10.1109/ARITH.2011.21, pp. 87-91.

Trong, et al., "P6 Binary Floating-Point Unit", 18th IEEE Symposium on Computer Arithmetic (ARITH'07), pp. 77-86, © 2007 IEEE.
U.S. Appl. No. 14/089,882, filed Nov. 26, 2013.

* cited by examiner

FAST NORMALIZATION IN A MIXED PRECISION FLOATING-POINT UNIT

CROSS REFERENCE TO RELATED APPLICATION

This application is a Continuation application of pending U.S. patent application Ser. No. 14/089,882 filed Nov. 26, 2013.

FIELD OF THE INVENTION

The present invention relates generally to the field of arithmetic operations, and more particularly to fast normalization of low precision rounded results in a mixed precision floating-point unit.

BACKGROUND OF THE INVENTION

Floating-point units have been constructed for performing arithmetic operations on single-precision floating-point data and double-precision floating-point data. Such floating-point units contain registers for storing floating-point data being processed, logic for processing the sign and exponent parts of floating-point data, mantissa arithmetic units for processing the mantissa, and logic for providing status signals to the processor controlling the floating-point unit.

In certain architectures, conversion of scalar floating-point data from single precision data into 64-bit double precision format occurs within any scalar single precision operation. For single precision numbers in the normal single precision data range, the conversion is very fast and achieved by padding the fraction with trailing zeros and re-biasing the exponent. For single precision denormal numbers, the exponent is re-biased, then the fraction is normalized, and the exponent is adjusted by the normalization shift amount. This requires an additional normalization stage for single precision results on the floating-point unit execution pipeline and on the load data path. State of the art implementations avoid the extra normalization step by storing single precision denormal numbers in an intermediate 65-bit format including the implied integer bit, in which the exponent is re-biased and the fraction is padded with trailing zeros. This additional information makes it possible to distinguish between single precision denormal and double precision normal numbers, both sharing the same exponent. This scheme works well when scalar floating-point data are only consumed by the scalar floating-point unit.

SUMMARY

Embodiments of the present invention disclose a hardware circuit and method for returning scalar single precision denormal results to double precision normal results in architected format with limited latency impact on performance. A hardware circuit component configured to count leading zeros of an unrounded single precision denormal result, wherein counting leading zeros happens in parallel to fraction rounding of the unrounded single precision denormal result. A hardware circuit component configured to pre-compute a first exponent and a second exponent for the unrounded single precision denormal result, wherein the first exponent equals the minimum exponent threshold of the single precision denormal result minus the number of leading zeros of the unrounded single precision denormal result, and the second exponent equals the minimum exponent threshold of the single precision denormal result minus the number of leading zeros of the unrounded single precision denormal result plus one. A hardware circuit component configured to determine when number of leading zeros of a rounded single precision denormal result does not equal the number of leading zeros of the unrounded single precision denormal result. A hardware circuit component configured to perform a second normalization of the rounded single precision denormal result back to architected format, wherein the second normalization includes selecting the first exponent or the second exponent, and normalizing the selected exponent in parallel to faction normalization.

DETAILED DESCRIPTION

Figure 1:
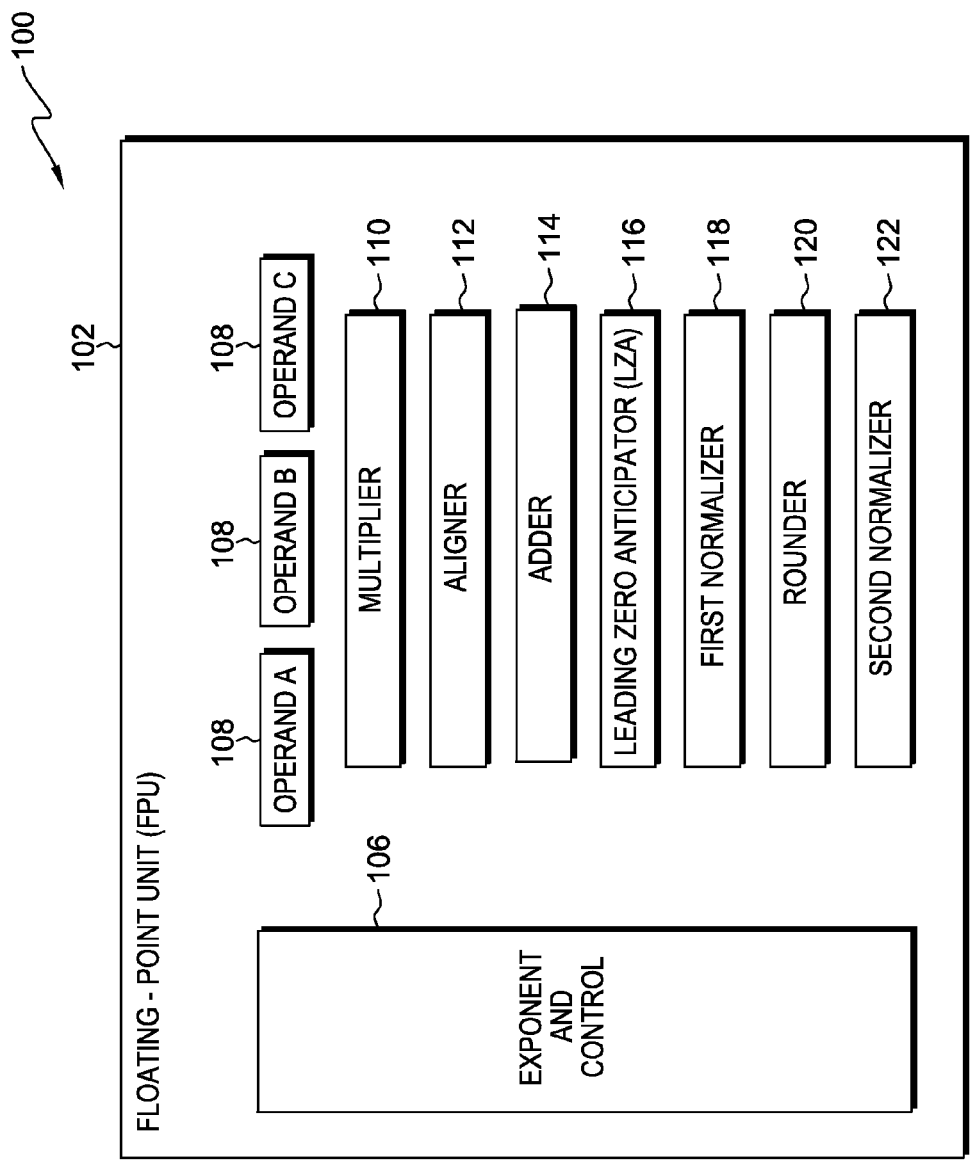
FIG. 1 is a block diagram of a data processor, generally designated 100, in accordance with an embodiment of the present invention.

Currently, scalar double precision data are also accessed by other execution units (made possible since the introduction of VSX architecture in POWER7 floating-point units). Embodiments of the present invention recognize that a PowerPC binary floating-point unit, when executing a scalar single precision operation, reads double precision operands, computes a single precision result, and expands the single precision result back to a double precision format. Usually, expanding the single precision result back to the double precision format is straightforward. However, expanding the single precision result back to the double precision format proves problematic where a result, "R," is de normal (i.e., $2^{-149} \leq [R] < 2^{-126}$)since "R" is normal in the double precision format. An additional normalization step removes fraction leading zeros and adjusts the exponents; however, the additional normalization step increases latency, thus negatively impacting performance.

Embodiments of the present invention provide the capability to return denormal single precision results to an architected format, with limited latency impact on performance, by controlling a normalizer by the number of leading zeros of an unrounded fraction, instead of controlling the normalizer by the number of leading zeros of a rounded fraction.

Implementation of such embodiments may take a variety of forms, and exemplary implementation details are discussed subsequently with reference to the Figures.

As will be appreciated by one skilled in the art, aspects of the present invention may be embodied as a method, system, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by, or in connection, with an instruction execution system, apparatus, or device.

A computer-readable signal medium may include a propagated data signal with computer-readable program code embodied therein, for example, in baseband or as part of a carrier wave. Such a propagated signal may take any of a variety of forms including, but not limited to, electro-magnetic, optical, or any suitable combination thereof. A computer-readable signal medium may be any computer-readable medium that is not a computer-readable storage medium and that can communicate, propagate, or transport a program for use by, or in connection, with an instruction execution system, apparatus or device.

Program code embodied on a computer-readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk®, C++ or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process, such that the instructions that execute on the computer or other programmable apparatus provide processes for implementing the functions/acts specified in the flowchart and/or block diagram block or blocks.

The present invention will now be described in detail with reference to Figures. FIG. 1 illustrates a data processor, generally designated 100, according to an exemplary embodiment of the present invention. Data processor 100 includes a Floating-Point Unit (FPU) 102. Data processor 100 may be implemented in a plurality of processor architectures that issue and execute instructions, such as single or multi-core microprocessors or micro controllers.

In the exemplary embodiment, FPU 102 is a PowerPC floating point unit (e.g., as implemented in POWER6, POWER7, and POWER8) capable of operating on single precision and double precision data. FPU 102 is configured to offer native support for mixed precision operations as required by IEEE 754 standard. FPU 102 has at least one instruction set for scalar single precision operations. FPU 102, when executing a scalar single precision operation, reads double precision operands, computes a single precision result, and expands the result back into double precision format. FPU 102 may be a pipelined floating-point architecture capable of operating on three scalar operands 108, denoted A, B, and C. FPU 102 includes 6 cycles for executing a plurality of functions. FPU 102 may receive floating point instructions from an issue unit (not shown), which may be capable of issuing instructions from a plurality of threads.

FPU 102 includes an exponent and control (EC) 106, a multiplier 110, an aligner 112, an adder 114, a leading zero anticipator (LZA) 116, a first normalizer 118, a rounder 120, and a second normalizer 122. FPU 102 is pipelined to further improve performance. Accordingly, FPU 102 includes a plurality of pipeline stages for performing one or more operations on single and double precision operands. In one embodiment, the multiplication of operands may be performed in a first stage of the pipeline, outputting two partial products that need to be added in a later pipeline stage.

Aligner 112 aligns a third operand to the product computed by multiplier 110, based on the exponent difference between the product and addend. While alignment is shown as a separate pipeline stage in FIG. 1, one skilled in the art will recognize that the multiplication and alignment may be performed in the same pipeline stage.

Adder 114 adds two or more multiplier partial products in FPU 102. In the exemplary embodiment, adder 114 may also add the product to another scalar operand 108C. Operand 108C, like operands 108A and 108B, may be derived from one of the buses connecting a register (not shown) to FPU 102. Therefore, FPU 102 may be configured to perform a multiply-add instruction. One skilled in the art will recognize that multiply-add instructions are frequently performed in floating-point applications. Therefore, by offering support for fused multiply-add operations, the efficiency of the floating-point processing may be significantly improved. In the exemplary embodiment, adder 114 sends input data fractions to first normalizer 118 for processing. LZA 116 predicts the leading bit position in parallel with the addition step so as to enable the normalization shift to be started as the addition completes.

First normalizer 118 is capable of removing fraction leading zero bits and exponent adjustment. In the exemplary embodiment, first normalizer 118 presents a denormalized fraction in a normalized format. For example, first normalizer 118 may receive a binary value 0.0000011 as a result of an operation. First normalizer 118 may convert the value into a more suitable normalized format, such as, $1.1 \times 2^{-6}$. However, for IEEE correct rounding of denormal results, the normalizer is configured to not normalize beyond the minimum exponent of the result precision.

Rounder 120 rounds a computed value to a desired number of binary points. Rounder 120, if the result is tiny, receives a denormal input fraction from first normalizer 118. For example, a computed value of $0.0001\_0000\_0000\_0000\_0011\_1111 \times 2^{-126}$ may be rounded to $0.0001\_0000\_0000\_0000\_0100\_000 \times 2^{-126}$. Rounder 120 yields a single precision denormalized fraction result. In another embodiment, rounder 120 may round the least significant bits of the particular precision floating-point number that rounder 120 is designed to work with.

Second normalizer 122 returns data received from rounder 120 to an architected format. For example, second normalizer 122 receives a denormal result $0.0001\_0000\_0000\_0000\_0100\_000 \times 2^{-126}$ from rounder 120 and returns that result to the architected representation $1.0000\_0000\_0000\_0100\_0000\_000 \times 2^{-130}$. In the above example, the architected format is a normalized result with an adjusted exponent reflecting the number of leading zeros removed to return the denormal value to a normal value.

One skilled in the art will recognize that embodiments of the invention are not limited to the particular pipeline stages, components, and arrangement of components described above and in FIG. 1. Furthermore, embodiments of the present invention are not limited to the particular components described in FIG. 1. Any combination of the described components and additional components may be included in the FPU.

Figure 2:
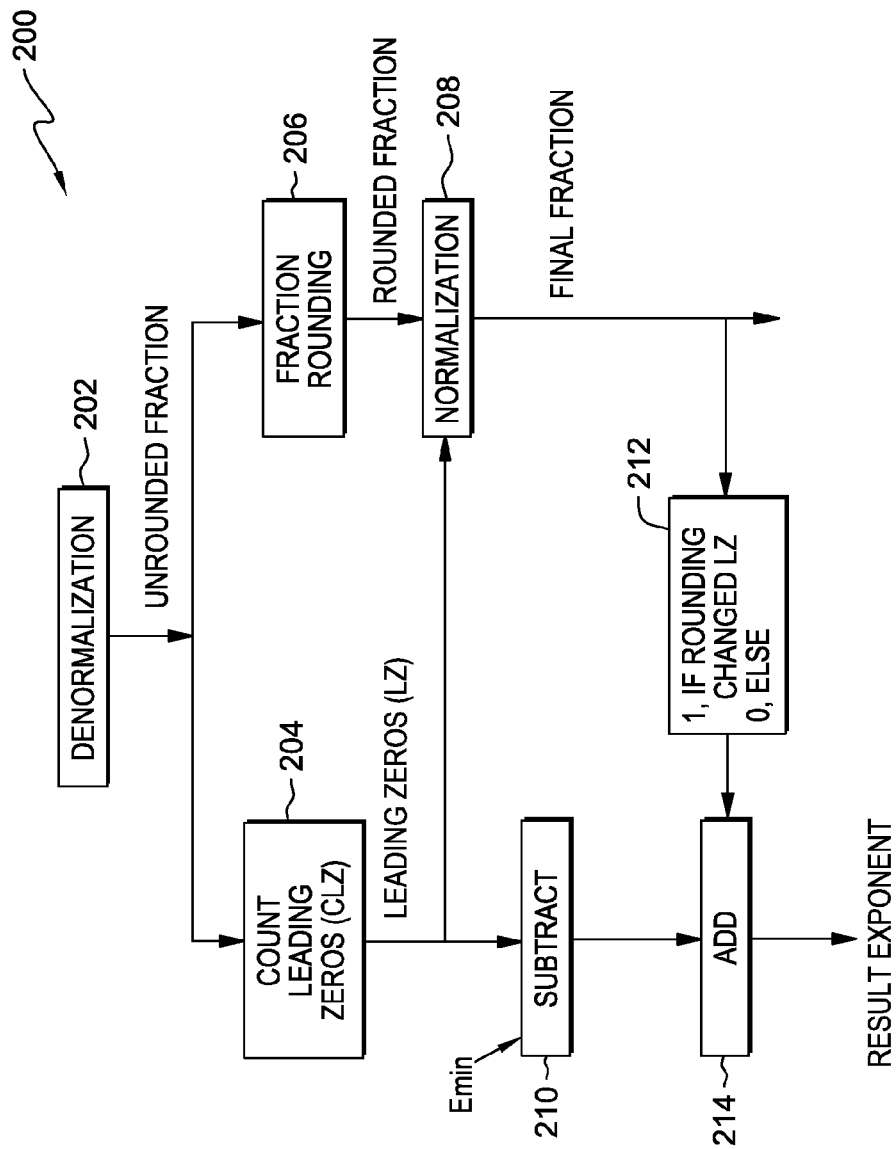
FIG. 2 is an exemplary illustration of a portion of Floating Point Unit (FPU) 102 of FIG. 1, generally designated 200, for returning scalar single precision denormal results to double precision normal results in architected format, in accordance with an embodiment of the present invention.

FIG. 2 illustrates in greater detail a configuration diagram, 200, of an exemplary embodiment of a portion of FPU 102 of FIG. 1, including first normalizer 118, rounder 120, and second normalizer 122. In the exemplary embodiment, FPU 102 is configured to return scalar single precision denormal results to double precision normal results in architected format, with limited latency impact on performance, by controlling second normalizer 122 by a number of leading zeros of an unrounded fraction, instead of controlling second normalizer 122 by a number of leading zeros of a rounded fraction.

In the exemplary embodiment, first normalizer 118 performs fraction leading zero removal and exponent adjustment up to a minimum exponent threshold (Emin) on the single precision denormal result (202). For single precision results, Emin is equal to −126, which is the exponent value of the implied bit if the result is in the range $2^{-149} \leq [R] < 2^{-126}$. For IEEE correct rounding of a denormal result, the result cannot be normalized beyond Emin and, as such, rounder 120 receives a denormal input fraction.

In the exemplary embodiment, FPU 102 counts leading zeros of rounder input (i.e., unrounded single precision denormal result) (204). Instead of proceeding through the critical path to rounder 120 for fraction rounding, and then counting leading zeros of a rounded fraction, FPU 102 counts leading zeros of an unrounded fraction in parallel to fraction rounding by rounder 120. For example, the counting leading zeros function may take place in either first normalizer 118 or in rounder 120 simultaneously (i.e., in the same clock cycle) with the fraction rounding by rounder 120. Fraction rounding by rounder 120 takes longer to complete than counting leading zeros. Counting leading zeros in parallel (i.e., in the same clock cycle) to fraction rounding eliminates the dependency of counting leading zeros on fraction rounding by circumventing the critical path through rounder 120, thereby reducing operational delay within FPU 102.

In the exemplary embodiment, the counting leading zeros function resides in rounder 120. For example, additional circuits may be included in rounder 120 to count leading zeros in parallel to fraction rounding. In another embodiment, the counting leading zeros function may reside in first normalizer 118. For example, additional circuits may be included in first normalizer 118 to count leading zeros in parallel to fraction rounding in rounder 120 (i.e., lengthen the clock cycle accordingly). Counting of the leading zeros happens at the output of the normalizer, available at any time after normalization in first normalizer 118, and prior to fraction rounding in rounder 120.

In the exemplary embodiment, rounder 120 performs fraction rounding of denormal fraction results of first normalizer 118 (206). Fraction rounding can reduce the leading zero count by at most 1 leading zero. Then the rounded fraction becomes a negative power of 2. For example, rounder 120 can round $0.0011\_1111\_1111\_1111\_1111\_1111 \times 2^{-126}$ (three leading zeros) to $0.0100\_0000\_0000\_0000\_0000\_000 \times 2^{-126}$ (two leading zeros). Second normalizer 122 will then normalize the rounder output to $10.0000\_0000\_0000\_0000\_0000\_000 \times 2^{-129}$ (incorrectly normalized) instead of $1.0000\_0000\_0000\_0000\_0000\_000 \times 2^{-128}$ (correctly normalized). In IEEE format, only the bits after the binary point are part of the result, therefore, the fraction bits outputs of normalizer 122 (all being zero) are nevertheless correct, and only the wrong exponent needs to be corrected.

In the exemplary embodiment, second normalizer 122 normalizes the rounded fraction and exponent in parallel (208, 210). Fraction and exponent normalization depends on the counting leading zeros function. For example, normalizer 122 receives a shift amount from the counting leading zero function derived from the number of leading zeros in the unrounded fraction. In the exemplary embodiment, normalizer 122 expands the denormal fraction result from rounder 120 back to architected (i.e., normal) format. For example, if the result of rounder 120 is $0.00110 \times 2^{emin}$, then normalizer 122 will expand the denormal result back to architected format, $1.10000 \times 2^{emin-lz}$ where "lz" represents the number of counted leading zeros of the unrounded fraction.

The exemplary embodiment of FPU 102 proves correct only if the number of leading zeros in a rounded fraction (lz rounded) equals the number of leading zeros in an unrounded fraction (lz unrounded). Rounding reduces the leading zero count by at most 1. If the number of leading zeros in the rounded fraction does not equal the number of leading zeros in the unrounded fraction, then the rounded fraction is a power of 2 and the shift amount is off by one decimal place.

In the exemplary embodiment, FPU 102 determines when this situation happens and corrects the error (212). For example, normalizer 122 may be constructed 1 bit longer to determine if the leading integer (e.g., 1) is shifted out. If FPU 102 determines that the leading integer is shifted out, then the number of leading zeros was changed by rounder 120. In the situation where lz rounded does not equal lz unrounded, FPU 102 corrects the exponent, i.e., the exponent for the rounded exponent of the normalized faction result is corrected by incrementing the rounded exponent of the normalized exponent by 1 decimal place (214).

Figure 3:
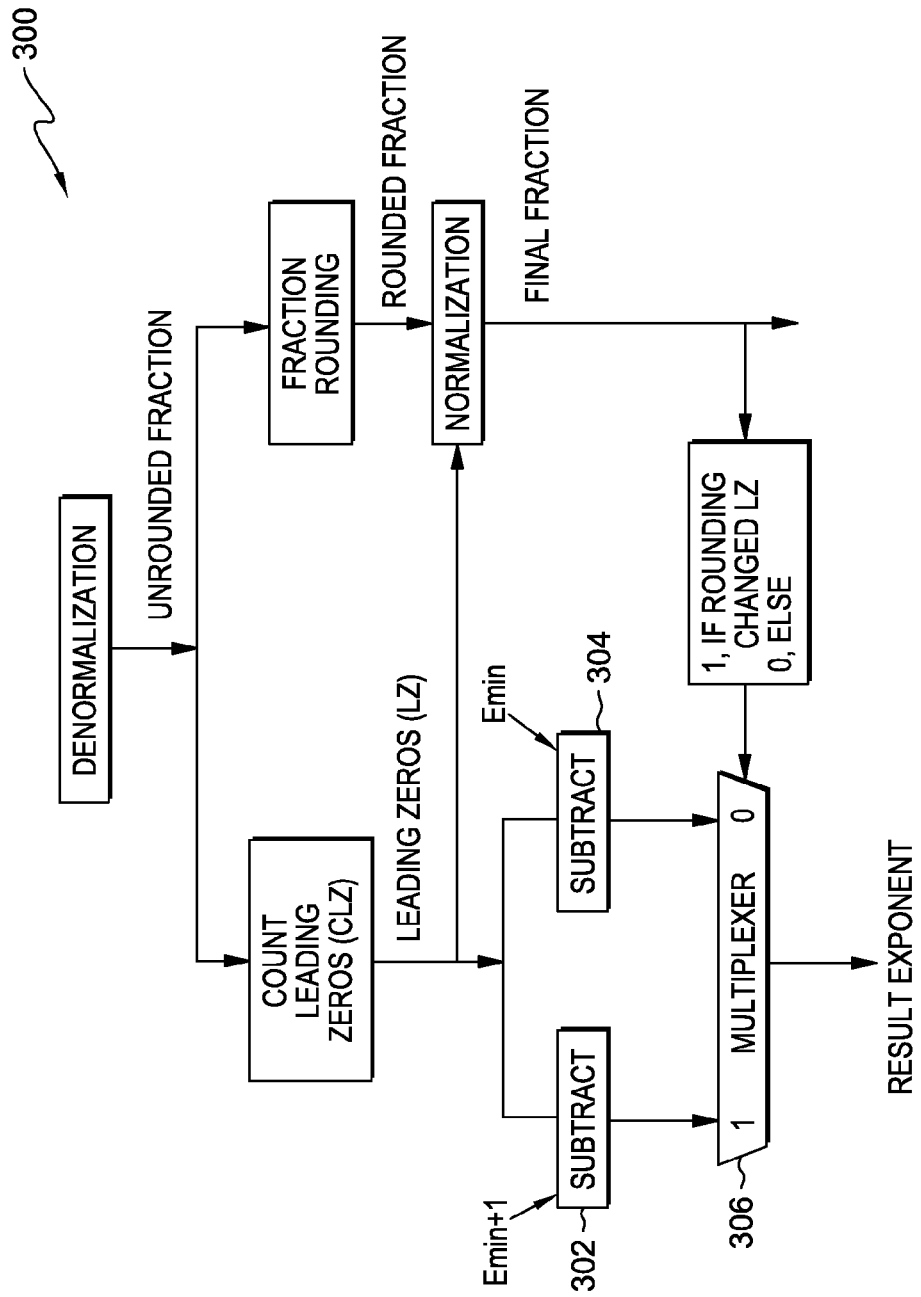
FIG. 3 illustrates in greater detail an exemplary configuration of the portion of FPU 102 in FIG. 2, generally designated 300, depicting components that function to pre-compute and select exponents, in accordance with an embodiment of the present invention.

FIG. 3 illustrates in greater detail a configuration diagram, 300, of an exemplary embodiment of a portion of FPU 102 of FIG. 1, depicting components that function to pre-compute and select incremented exponents.

In the exemplary embodiment, FPU 102 pre-computes incremented exponent 302 (Emin−lz+1) and normal exponent 304 (Emin−lz). FPU 102 selects, based on the output of normalizer 122, either incremented exponent 302 or normal exponent 304. For example, if FPU 102 determines that after normalization by normalizer 122 there has been a change in the amount of leading zeros (i.e., normalizer 122 designed 1 bit position longer and determine if leading 1 shifted out, indicating that the number of leading zeros is off by one bit position after rounding by rounder 120), then FPU 102 selects incremented exponent 302 to correct the change in leading zeros and return the result of normalizer 122 to architected format. If FPU 102 determines that after normalization by normalizer 122 there has not been a change in the amount of leading zeros (i.e., lz rounded=lz unrounded), then FPU 102 selects normal exponent 304.

In the exemplary embodiment, FPU 102 pre-computes incremented exponent 302 and normal exponent 304 via two subtractor circuits, and outputs the pre-computed exponents to multiplexer 306. In response to the leading zero count, FPU 102 selects either incremented exponent 302 (for cases where lz rounded=lz unrounded+1) or normal exponent 304 (for cases where lz rounded=lz unrounded) from multiplexer 306 to produce a result in architected format.

In the exemplary embodiment, pre-computing incremented exponent 302 and normal exponent 304 occurs in two respective subtractor circuits after the counting leading zeros function, and in parallel with the second normalization by normalizer 122 (i.e., fraction normalization and exponent normalization occur in parallel). Fraction normalization and exponent normalization depend on the counting leading zeros function.

Figure 4:
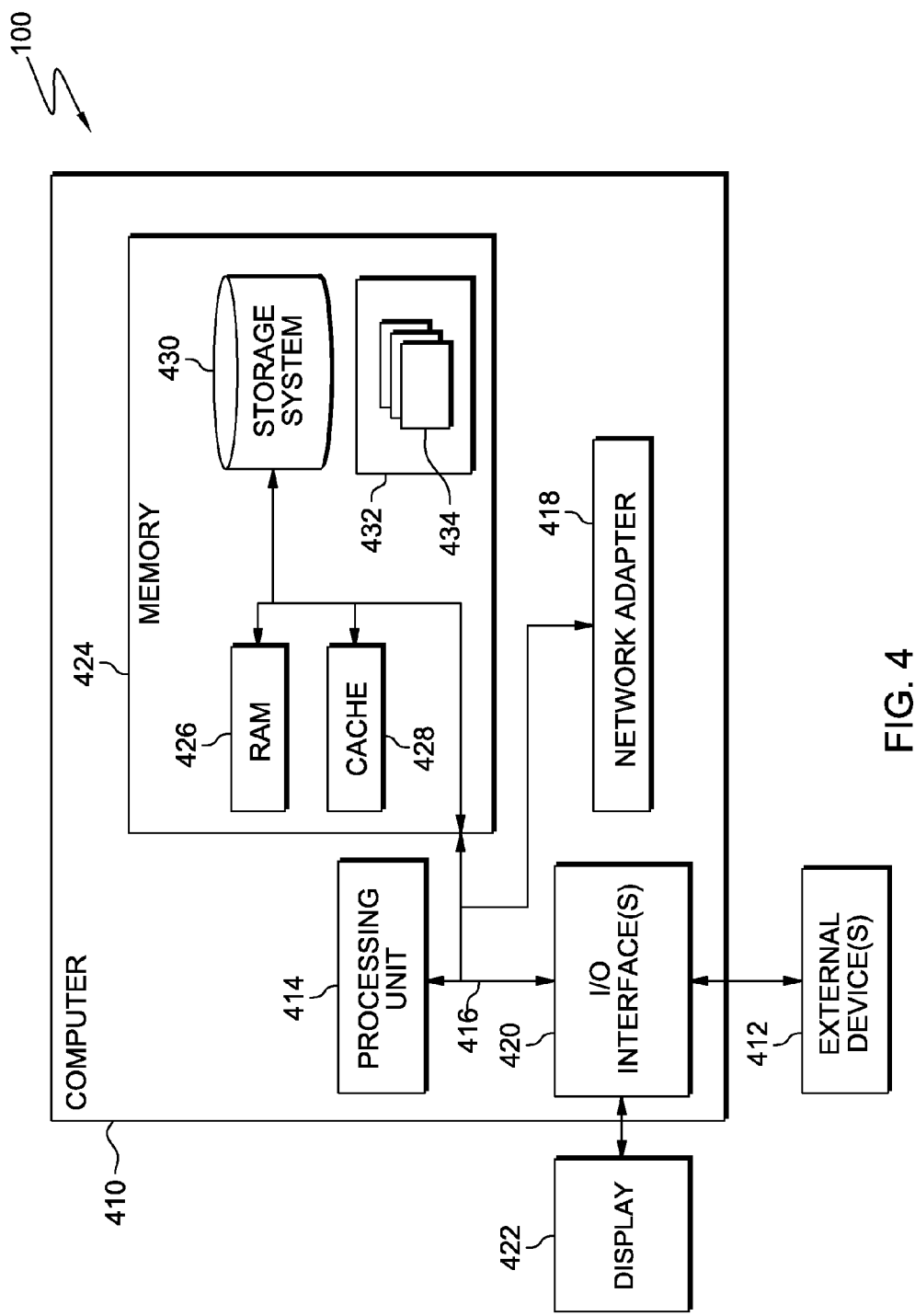
FIG. 4 is a block diagram of components of a data processing system, generally designated 400, in accordance with an embodiment of the present invention.

FIG. 4 depicts a block diagram of components of data processing system 100, in accordance with an illustrative embodiment of the present invention. It should be appreciated that FIG. 4 provides only an illustration of one implementation and does not imply any limitations with regard to the environments in that different embodiments may be implemented. Many modifications to the depicted environment may be made.

Computer system 410 in data processing system 100 is shown in the form of a general-purpose computing device. The components of computer system 410 may include, but are not limited to, one or more processors or processing units 414, a system memory 424, and a bus 416 that couples various system components including system memory 424 to processor 414.

Bus 416 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 410 typically includes a variety of computer system readable media. Such media may be any available media that is accessible by computer system 410, and it includes both volatile and non-volatile media, removable and non-removable media.

System memory 424 can include computer system readable media in the form of volatile memory, such as random access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 416 by one or more data media interfaces. As will be further depicted and described below, system memory 424 may include at least one computer program product having a set (e.g., at least one) of program modules that are configured to carry out the functions of embodiments of the invention.

Program/utility 432, having one or more sets of program modules 434, may be stored in memory 424 by way of example, and not limitation, as well as an operating system, one or more application programs, other program modules, and program data. Each of the operating systems, one or more application programs, other program modules, and program data, or some combination thereof, may include an implementation of a networking environment. Program modules 434 generally carry out the functions and/or methodologies of embodiments of the invention as described herein. Computer system 410 may also communicate with one or more external devices 412 such as a keyboard, a pointing device, a display 422, etc., or one or more devices that enable a user to interact with computer system 410 and any devices (e.g., network card, modem, etc.) that enable computer system 410 to communicate with one or more other computing devices. Such communication can occur via Input/Output (I/O) interfaces 420. Still yet, computer system 410 can communicate with one or more networks such as a local area network (LAN), a general wide area network (WAN), and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives, and data archival storage systems may be used in conjunction with computer system 410.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for returning scalar single precision denormal results to double precision normal results in architected format with limited latency impact on performance utilizing an improved floating-point unit architecture, the method comprising:

performing a first normalization on a first unrounded single precision denormal result of a floating-point operation, wherein the first normalization includes performing fraction leading zero removal and exponent adjustment up to a minimum exponent threshold on the first unrounded single precision denormal result to yield a second unrounded single precision denormal result, wherein performing the first normalization includes utilizing a first normalizer circuit of the improved floating-point unit architecture;

counting leading zeros of the second unrounded single precision denormal result;

performing fraction rounding of the second unrounded single precision denormal result to yield a rounded single precision denormal result, wherein performing fraction rounding includes utilizing a floating-point unit rounder circuit of the improved floating-point unit architecture;

pre-computing a first exponent and a second exponent for the second unrounded single precision denormal result in parallel with a second normalization of the rounded single precision denormal result, wherein pre-computing includes utilizing a floating-point unit subtractor circuit of the improved floating-point unit architecture; and outputting a final fraction result by performing the second normalization of the rounded single precision denormal result back to architected format, wherein performing the second normalization includes utilizing a second normalizer circuit of the improved floating-point unit architecture;

wherein the architected format includes the final fraction result and one of the first exponent and the second exponent.

2. The method of claim 1, wherein counting leading zeros of the second unrounded single precision denormal result, further comprises counting leading zeros in parallel to fraction rounding of the second unrounded single precision denormal result.

3. The method of claim 1, wherein pre-computing the first exponent and the second exponent for the second unrounded single precision denormal result, further comprises pre-computing the first exponent as the minimum exponent threshold of the first unrounded single precision denormal result minus the number of leading zeros of the second unrounded single precision denormal result.

4. The method of claim 1, wherein pre-computing the first exponent and the second exponent for the second unrounded single precision denormal result, further comprises pre-computing the second exponent as the minimum exponent threshold of the first unrounded single precision denormal result minus the number of leading zeros of the second unrounded single precision denormal result plus one.

5. The method of claim 1, wherein performing the second normalization of the rounded single precision denormal result back to architected format, further comprises selecting the first exponent for a final fraction result based, at least in part, on a determination that the number of leading zeros has changed as a result of fraction rounding.

6. The method of claim 5, wherein selecting the first exponent, further comprises determining whether the number of leading zeros of the second unrounded single precision denormal result does not equal the number of leading zeros of the rounded single precision denormal result.

7. The method of claim 1, wherein performing the second normalization of the rounded single precision denormal result back to architected format, further comprises selecting the second exponent for a final fraction result based, at least in part, on a determination that the number of leading zeros has not changed as a result of fraction rounding.

8. The method of claim 7, wherein selecting the second exponent, further comprises determining whether the number of leading zeros of the second unrounded single precision denormal result equals the number of leading zeros of the rounded single precision denormal result.

9. The method of claim 1, wherein performing the second normalization of the rounded single precision denormal result back to architected format, further comprises normalizing a selected one of the first exponent and the second exponent in parallel to fraction normalization.

* * * * *